United States Patent

Brown et al.

[11] Patent Number: 5,915,837
[45] Date of Patent: *Jun. 29, 1999

[54] QUICK-DISCONNECT COUPLING DEVICE

[75] Inventors: Eric A. Brown, Belvue, Kans.;
Howard T. Koshi, Redmond, Wash.;
James G. Nickels, Manhattan, Kans.

[73] Assignee: Caterpillar Inc., Peoria, Ill.

[*] Notice: This patent is subject to a terminal disclaimer.

[21] Appl. No.: 08/863,756

[22] Filed: May 27, 1997

[51] Int. Cl.⁶ .................................................... E02F 3/96
[52] U.S. Cl. ......................... 37/468; 403/322; 403/319; 414/723
[58] Field of Search .................. 37/468, 231, 403–407; 172/272, 275; 403/322, 325, 319; 414/723, 724

[56] References Cited

U.S. PATENT DOCUMENTS

| | | | |
|---|---|---|---|
| 3,818,551 | 6/1974 | Coughran, Jr. | 24/243 |
| 3,935,953 | 2/1976 | Stedman | 214/145 A |
| 4,042,138 | 8/1977 | Buttke | 214/138 R |
| 4,116,347 | 9/1978 | Uchida | 214/145 A |
| 4,187,050 | 2/1980 | Barbee | 414/723 |
| 4,278,368 | 7/1981 | Livesay | 404/117 |
| 4,944,628 | 7/1990 | Huldén | 403/24 |
| 5,232,502 | 8/1993 | Recker | 118/317 |
| 5,456,030 | 10/1995 | Barone et al. | 37/468 |
| 5,549,440 | 8/1996 | Cholakon et al. | 37/468 X |
| 5,581,917 | 12/1996 | Barden | 37/468 |
| 5,597,283 | 1/1997 | Jones | 37/468 X |
| 5,634,736 | 6/1997 | Brown et al. | 403/322 |
| 5,692,850 | 12/1997 | Kimble et al. | 37/468 X |
| 5,779,429 | 7/1998 | Poole | 37/468 X |

*Primary Examiner*—Victor Batson
*Attorney, Agent, or Firm*—Larry G. Cain

[57] ABSTRACT

A combination of an attachment, a power device and a quick-disconnect coupling device for attaching a variety of attachments to a stick includes a pair of brackets attached to the attachment, a frame assembly being attached to the power device and an activation device. The actuation device having a plurality of linkage members being positioned in a locked position when the power device is attached to the attachment and being in an open position when not being attached to the attachment. The linkage members including a latch having a pair of ends being spaced apart and in the locked position being in contacting relationship with the each of the pair of brackets.

8 Claims, 5 Drawing Sheets

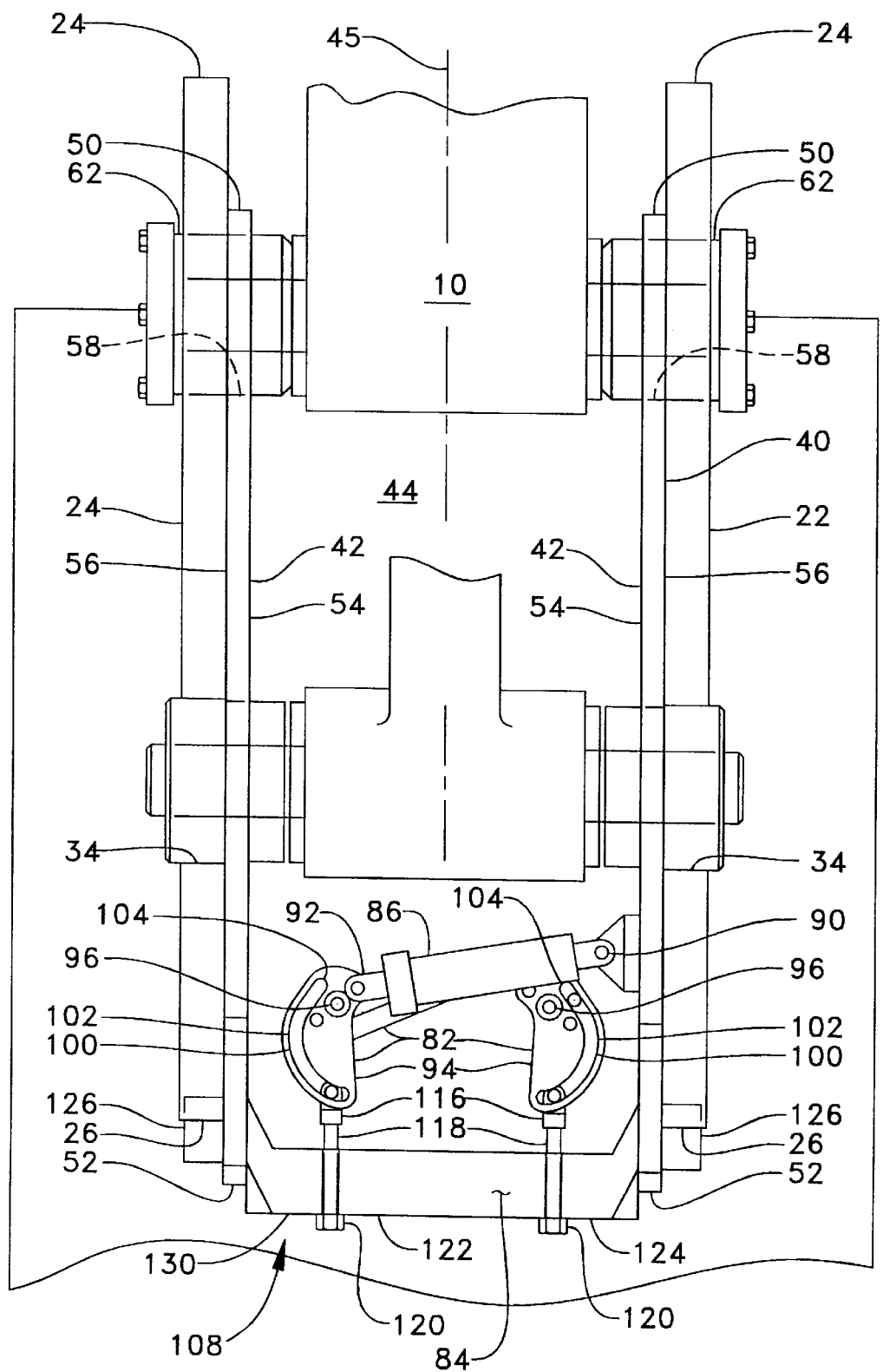

QUICK-DISCONNECT COUPLING DEVICE

TECHNICAL FIELD

This invention relates generally to quick-disconnect couplings and more particularly suited to couplings for affixing tools to an earth moving vehicle such as a stick of an excavator or backhoe.

BACKGROUND ART

In use, earth moving vehicles perform many different functions such as excavating dirt, rock and other material. For example, during the excavation operations different attachments may be required, such as a different size of bucket, an impact breaker or a grapple arrangement. Each of these attachments has a specific advantage of one verses the other. Thus, to be able to change from ore attachment to another with ease and a limited waste of time is of the utmost importance.

To date, many of these changes require time-consuming manual processes involving the removal of force-fit pins or the like, through the use of specially fabricated adapters, or through the use of expensive and complex coupling devices which frequently require specially designed tools.

Furthermore, some of the coupling devices are actuated by hydraulic cylinders or such devices and require the device to be maintained under pressure to complete and maintain the attachment in the attached mode.

The present invention is directed to overcoming one or more of the above problems.

DISCLOSURE OF THE INVENTION

In one aspect of the invention, a quick-disconnect device is comprised of a pair of brackets being fixedly attached to an attachment, a frame assembly being attached to a power device and an activation device being attached to the frame assembly. The activation device removably attaches the frame assembly to the attachment. The activation device includes a plurality of linkage members being movable between an open position and a locked position. The plurality of linkage members defines a cam member having an over center or locking portion corresponding to the locked position. A locking member includes a latch having a pair of spaced apart ends which, when in the locked position, are in contacting relationship with the frame assembly.

BRIEF DESCRIPTION OF THE DRAWINGS

FIG. 5 is an enlarged view of the quick-disconnect device taken along line 5—5 of FIG. 4.

BEST MODE FOR CARRYING OUT THE INVENTION

Figure 1:
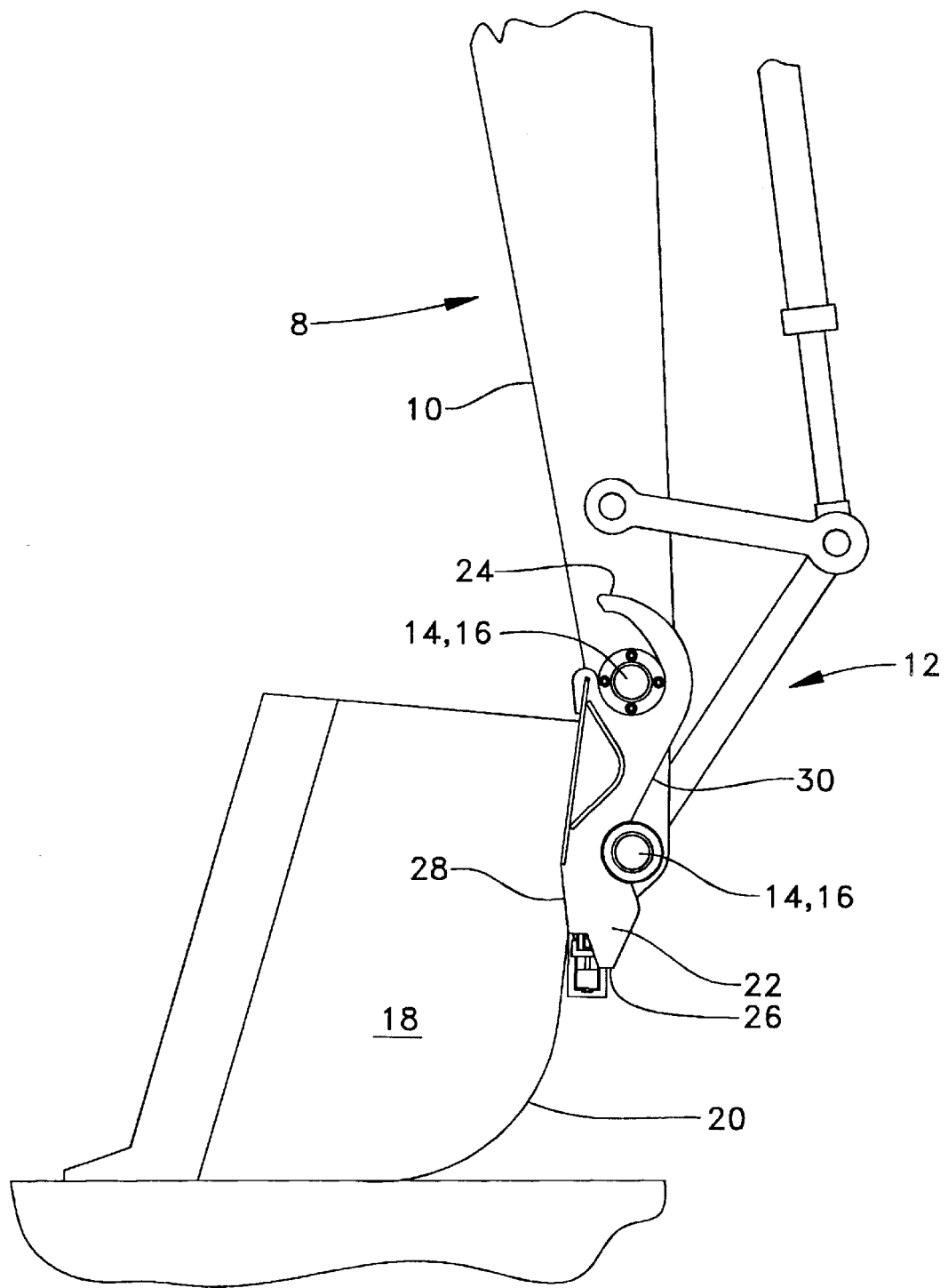
FIG. 1 is a side view of a typical excavator, shown schematically, having a stick embodying the present invention for mounting an attachment using a quick-disconnect device.
Figure 2:
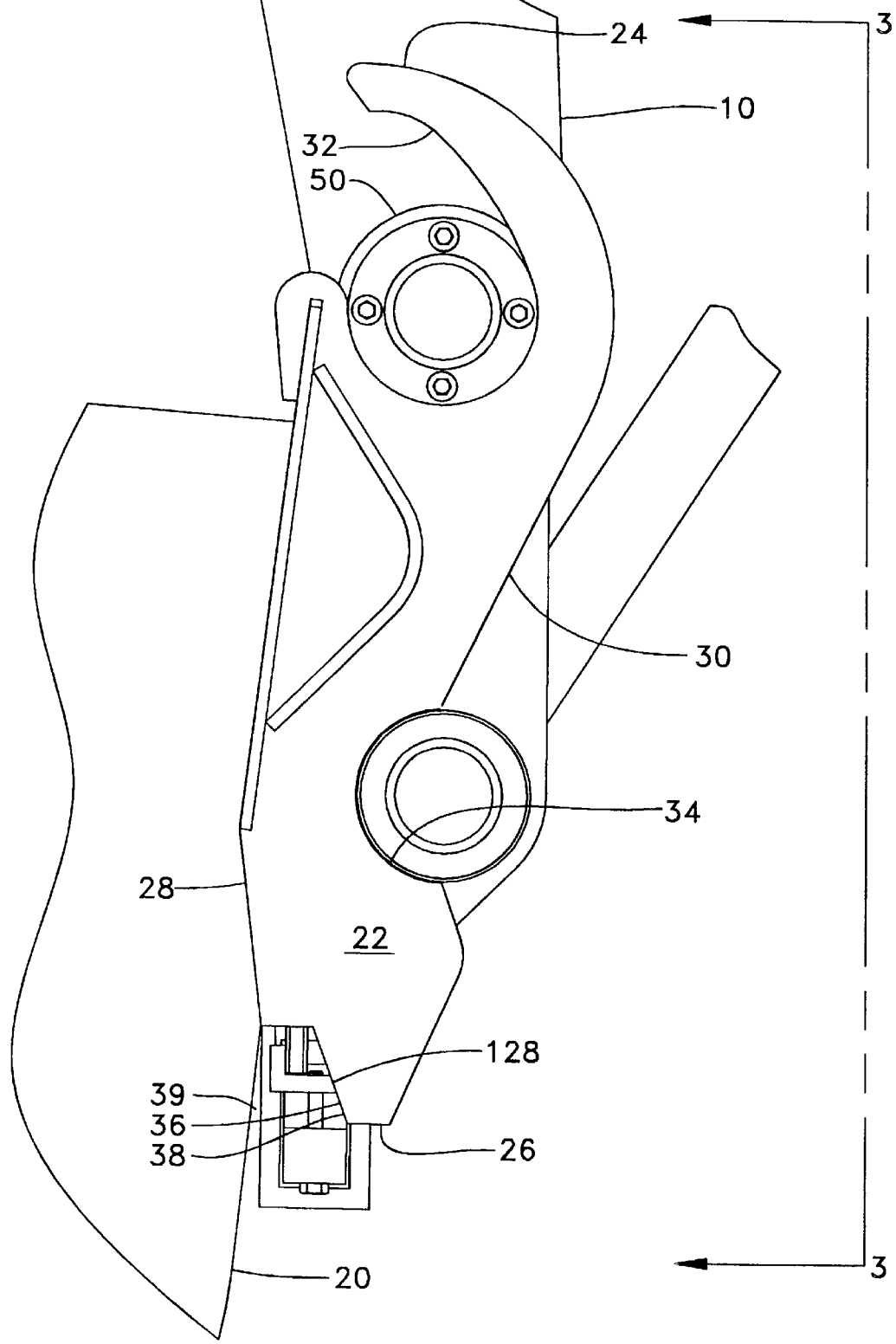
FIG. 2 is an enlarged side view of the quick-disconnect device having the attachment connected to the stick.
Figure 4:
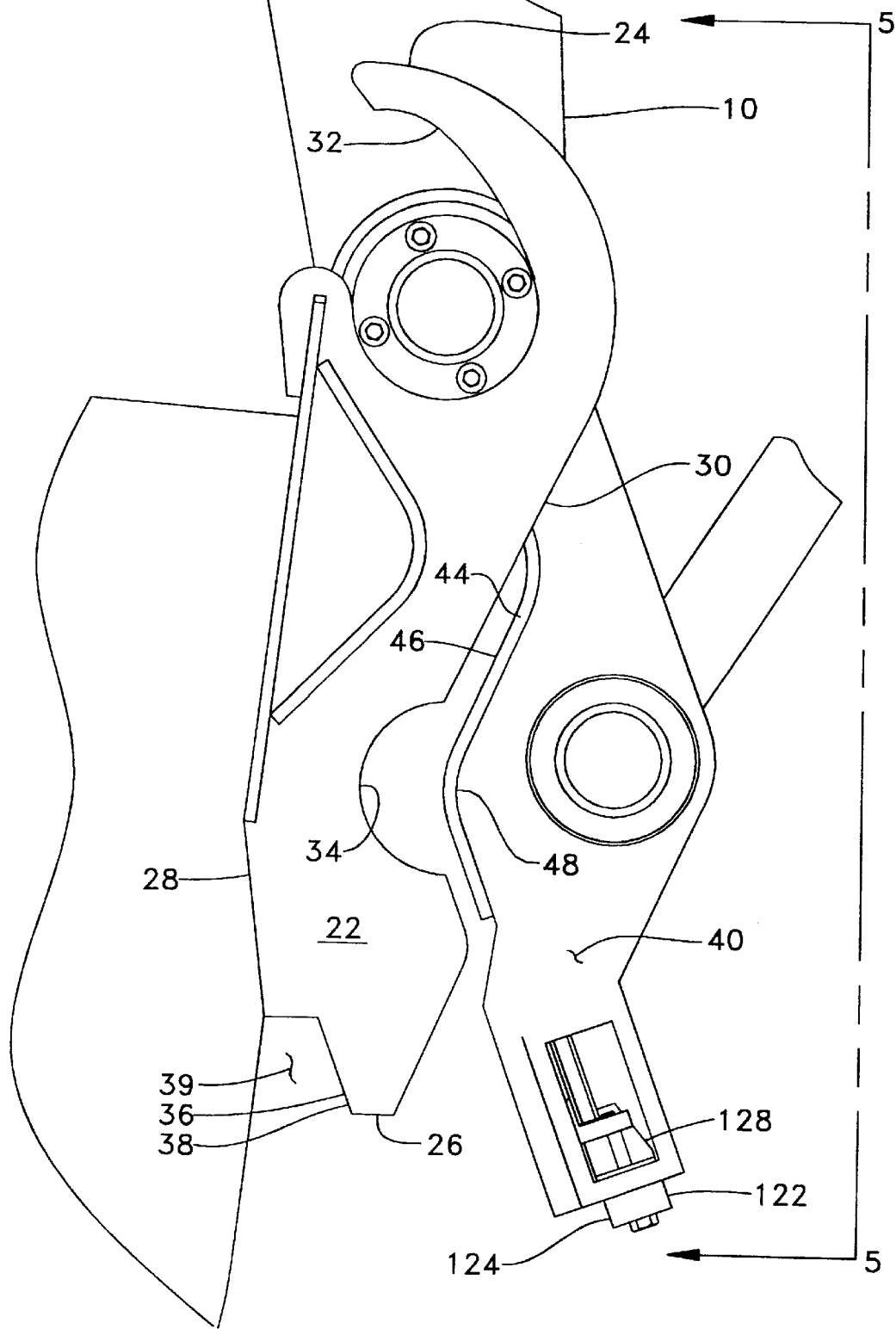
FIG. 4 is an enlarged side view of the quick-disconnect device having the attachment partially connected to the stick.

In reference to FIGS. 1, 2 and 4, a power device 8, not shown in its entirety, which in this application includes an excavator stick 10, not shown in its entirety and has a quick-disconnect device 12 attached to the stick 10 in a conventional manner, such as by a plurality of pins 14 and retainers 16. In the application shown, a bucket 18 is attached to the stick 10 by the quick-disconnect device 12. The bucket 18 includes a bowl member 20 having a pair of brackets 22 fixedly secured thereto. The pair of brackets 22 has a preestablished space therebetween, and each of the pair of brackets 22 includes an upper end 24, a lower end 26, a front side or surface 28 and a back side or surface 30. A pair of open ended elongate openings 32 being axially aligned is positioned near the upper end 24 and open at the front side 28 of the pair of brackets 22 and a pair of open-ended bores 34 being axially aligned is positioned near the lower end 26 and open at the back side 30 of the pair of brackets 22. The pair of open ended elongate openings 32 and the pair of open-ended bores 34 have a preestablished space therebetween. Each of the front sides 28 of the pair of brackets 22 further includes an inclined surface 36 defining a mating surface 38. The inclined surface 36 extends from the lower end 26 toward the upper end 24 a preestablished distance which, in the assembled position, forms a cavity 39 being interposed the pair of brackets 22 and the bowl member 20.

The quick-disconnect coupler 12 includes a frame assembly 40 being constructed of a pair of mounting plates 42 having a connecting plate 44 fixedly attached thereto and spacing each of the pair of mounting plates 42, one from the other, a preestablished distance about a centerline 45. The connecting plate 44 defines a front side or surface 46 and a back side or surface 48. Each of the pair of mounting plates 42 includes an upper end 50, a lower end 52, an inner side or surface 54 and an outer side or surface 56. A first pair of bores 58 being axially aligned is positioned near the upper end 50 of the pair of mounting plates 42 and a pair of second bores 60 being axially aligned is positioned near the lower end 52 of the pair of mounting plates 42. In the assembled position, the first pair of bores 58 is axially aligned with the open ended elongate openings 32 and the second pair of bores 60 is axially aligned with the pair of open ended bores 34 in the pair of brackets 22. In this application, the first pair of bores 58 and the second pair of bores 60 each have a cylindrical boss member 62 positioned within respective ones of the first pair of bores 58 and the second pair of bores 60. The cylindrical boss members 62 include an outer end 64, an inner end 66 and a stepped outer surface 68 having a first preestablished diameter positioned near the outer end 64 and extending axially from the outer end 64 a predetermined distance toward the inner end 66 and a second preestablished diameter being smaller than the first preestablished diameter extending axially from the first preestablished diameter to the inner end 66. Each of these cylindrical boss members 62 has one of the plurality of pins 14 positioned therein and the retainers 16 attach the quick-disconnect device 12 to the stick 10. As an alternative, the cylindrical boss members 62 can be rotatably or fixedly positioned within the first pair of bores 58 and/or the second pair of bores 60. And, if the cylindrical boss members 62 are rotatable, a conventional lubricating system can be used.

As an alternative to replaceable cylindrical boss members 62, the frame assembly 40 could include a cylindrical boss generally centered about the first pair of bores 58 and the second pair of bores 60 being attached to each of the inner sides 54 of each of the pair of mounting plates 12. Furthermore, the first pair of bores 58 and the second pair of bores 60 could each have a cylindrical boss being slightly larger than the cylindrical boss, 62 generally centered thereabout and being attached to each of the outer sides 56 of each of the pair of mounting plates 42. The cylindrical bosses would have a bore therein through which one of the plurality of pins 14 is positioned therein and the retainers 16 attach the quick-disconnect device 12 to the stick 10.

Figure 3:
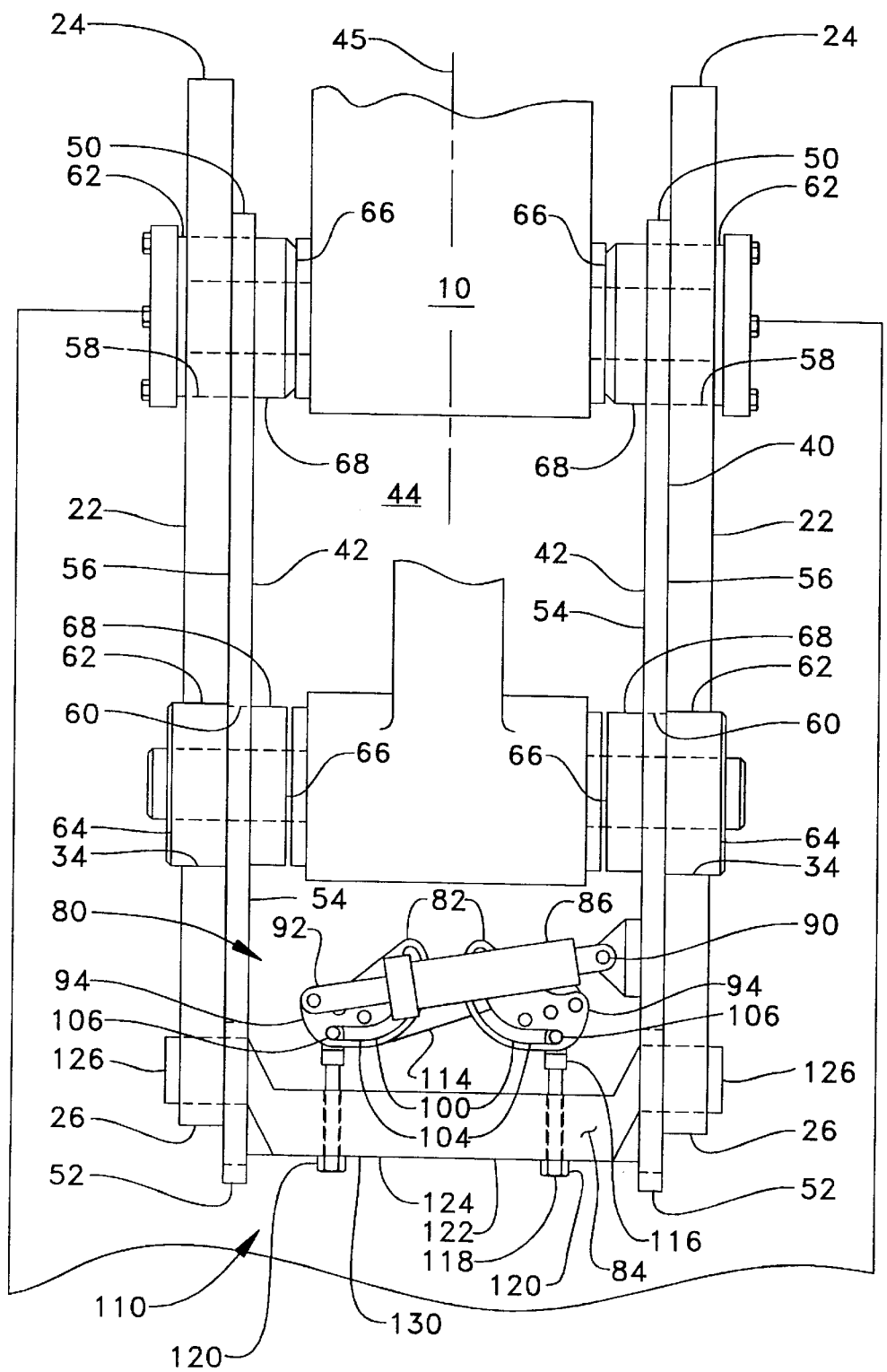
FIG. 3 is an enlarged view of the quick-disconnect device taken along line 3—3 of FIG. 2.

As best shown in FIGS. 3 and 5, attached to the connecting plate 44 on the back side 48 is an activation device 80 which includes a plurality of linkage members 82 for activating a securing member 84. The actuation device 80 is in communication with the operator's station of the hydraulic excavator 8 by a conventional system, not shown. In this application, the plurality of linkage members 82 is activated by a hydraulic cylinder 86, but, as an alternative, could include any type of actuating device such as a manual lever, an air cylinder, or an electrical solenoid. The hydraulic cylinder 86 is of conventional design and includes a head end 90 being attached to one of the pair of mounting plates 42 in a conventional manner and a rod end 92 being connected to a portion of the plurality of linkage members 82 in a conventional manner. The plurality of linkage members 82 includes a pair of cam members 94 being rotatably attached to the connecting plate 44 by a conventional pin, bushing and retainer arrangement 96. Each of the pair of cam members 94 further includes a recess 100 defined therein which has a preestablished configuration. For example, the preestablished configuration includes an arcuate portion 102, an over center or locking portion 104 located at one end of the arcuate portion 102 and an open portion 106 located at the other end of the arcuate portion 102. With the hydraulic cylinder 86 in the compressed condition, the cam members 94 position the securing member 84 in an open position 108 and, with the hydraulic cylinder 86 in the expanded position, the cam member 94 positions the securing member 84 in a locked or closed position 110. The locking portion 104 and the open portion 106 are at the further most extremity of the preestablished configuration of the recess 100.

A link member 114 connects each of the pair of cam members 94 in a conventional manner and operationally enables the pair of cam members 94 to systematically function in harmony. Each of the recesses 100 has a first end 116 of an adjustable member 118 slidably positioned therein. A second end 120 of the adjustable member 118 is attached to the securing member 84 forming a locking member 122. In this application, the locking member 122 includes a latch 124 having a pair of tapered ends 126 each defining a mating surface 128 thereon. The pair of tapered ends 126 is spaced one from the other and centered about the centerline 45. A body portion 130 of the securing member 84 is interposed the pair of tapered ends 126. Attached to the body 130 a preestablished distance from the centerline 45 is the second end 120 of the adjustable member 118. The mating surface 128 defined on each of the pair of tapered ends 126 is spaced from the centerline 45 at generally an equal distance. The distance from the centerline 45 to the mounted position of the second end 120 on the body 130 and the distance from the mounted position of the second end 120 on the body 130 to the mating surface 128 are generally equal. Furthermore, the relative position on each side of the centerline 45 of the mounted position of the second end 120 on the body 130 and the mating surface 128 are symmetrical. In the locked position 110 with the attachment 18 connected to the stick 10 by the quick-disconnect coupler 12, the mating surface 128 of the corresponding one of the pair of tapered ends 126 is in contacting relationship with the mating surface 38 on the corresponding one of the pair of brackets 22 and the pair of tapered ends 126 are positioned within the cavities 39. In the open position 108, the mating surface 128 of the corresponding one of the pair of tapered ends 126 is not in contacting relationship with the mating surface 38 on the corresponding one of the pair of brackets 22 but is spaced therefrom. And, the pair of tapered ends 126 are positioned out of the cavity 39.

Industrial Applicability

In use, a power device 8, such as a hydraulic excavator or backhoe, shown schematically, has the stick 10 extending therefrom to which is attached the bucket or an auxiliary attachment 18 used for a specific task. While performing the many tasks, the operator needs to perform a different task requiring a different attachment 18. Thus, the quick-disconnect device 12 comes into play. The operator initiates an operation to release the attachment 18 and the activation device 80 and the hydraulic cylinder 86 moving the plurality of linkage members 82. A portion of the plurality of linkage members 82 moves within the recess 100 from the closed or locked position 110 at the extremity of the over center portion 104 through the over center portion 104 and the arcuate portion 102 to the open portion 106 at the extremity of the arcuate portion 102 causing the pair of cam members 94 to rotate and systematically function in harmony. The adjustable members 118 exert a force on the body portion 130 of the locking member 122 causing the mating surfaces 128 on the pair of tapered ends 126 to move away from the inclined surfaces 36 on the pair of brackets 22. Thus, the pair of ends 126 move out of the cavity 39 allowing the attachment to be removed from the stick 10. The operator moves the stick 10 so that the portion of the cylindrical boss members 62 is in contact with the portion of the pair of open-ended bores 34, and the pair of open ended elongate openings 32 become disengaged and moves the frame assembly 40 away from the attachment 18. Thus, the attachment 18 is disconnected from the power device 8.

Next, the operator moves the power device 8 into position so as to attach the other of the attachments 18. The operator moves the frame assembly 40 into position so that a portion of the cylindrical boss members 62 are in contact with the portion of the pair of open ended elongate openings 32, picks up the attachment 18 and rotates the attachment until the cylindrical boss members 62 is in contact with the portion of the pair of open-ended bores 34. The operator initiates an operation to attach the attachment 18 and the activation device 80, and the hydraulic cylinder 86 moves the plurality of linkage members 82 into the appropriate position. However, during this cycle, a portion of the plurality of linkage members 82 moves within the recess 100 from the open portion 106 at the extremity of the arcuate portion 102 through the arcuate portion 102 and the over center portion or the locked portion 104 at the extremity of the recess 100 causing the pair of cam members 94 to rotate. The adjustable members 118 exert a force on the body 130 of the locking member 122 causing the mating surfaces 128 on the pair of tapered ends 126 to move toward the inclined surfaces 36 on the pair of brackets 22. Thus, the pair of ends 126 moves into the cavity 39 allowing the attachment to be attached in working relationship to the stick 10.

The position or spacing of the adjustable members 118 along the body 130 of the locking member 122 causes each of the pair of ends 126 to move uniformly and prevents cocking of the locking member 122. The spacing of the pair of ends 126 axially from the centerline 45 and being in contacting relationship with the spaced apart pair of brackets 22 on the attachment 18 insures that the connection between the power device 8 and the attachment is of structural integrity to withstand twisting, bending and additional induced forces.

Furthermore, the preestablished configuration of the recess 100, specifically the over center or locking portion 104 of the configuration, is so configured to maintain the quick-disconnect coupler 12 in the locked portion 104 and the closed position 110 even if the hydraulic cylinder 86 loses hydraulic power.

Other aspects, objects and advantages of this invention can be obtained from a study of the drawings, the disclosure and the appended claims.

We claim:

1. A combination of an attachment, a power device and a quick-disconnect device comprising:

a pair of brackets being fixedly attached to the attachment, said pair of brackets includes an upper end, a lower end, a front side, a back side, a pair of open ended elongated openings being axially aligned and positioned near the upper end and the back side with a pair of open-ended bores being axially aligned and positioned near the lower end and being open at the back side;

a frame assembly being attached to said power device, said frame assembly includes a pair of mounting plates having a plurality of boss members positioned thereon, said plurality of boss members being positioned on said pair of mounting plates to correspond to the position of said pair of open ended elongate openings and said pair of open-ended bores;

an activation device being attached to the frame assembly, said activation device removably attaching said frame assembly to said attachment;

said activation device, including a plurality of linkage members, being movable between an open position and a locking position said plurality of linkage members defining a pair of cam members each pair of cam members being positioned between the pair of mounting plates of said frame assembly and spaced a uniform distance from a respective one of said pair of mounting plates and being movable to an over center position defining said locking position, each of said pair of cam members includes a recess defining a preestablished configuration having an arcuate portion defining said over center position and said locking position; and a locking member movable between an open position and a locking position and including a latch having a pair of spaced apart ends, said activation device being moved in said locking position and having said pair of spaced apart ends being in contacting relationship with said frame assembly.

2. The combination of the attachment, the power device and the quick-disconnect device of claim 1 wherein said pair of brackets includes an inclined surface extending from the lower end toward the upper end.

3. The combination of the attachment, the power device and the quick-disconnect device of claim 2 wherein during operation said activation device moves through the recess from said open position to said locking position.

4. The combination of the attachment, the power device and the quick-disconnect device of claim 1 wherein a cavity is interposed the pair of brackets and the attachment when said locking member is in the open position.

5. The combination of the attachment, the power device and the quick-disconnect device of claim 4 wherein said pair of spaced apart ends is positioned in the cavity at the locking position of said locking member and is positioned out of the cavity at said open position of said locking member.

6. The combination of the attachment, the power device and the quick-disconnect device of claim 1 wherein said activation device includes a hydraulic cylinder being operatively attached to said plurality of linkage members.

7. The combination of the attachment, the power device and the quick-disconnect device of claim 6 wherein said hydraulic cylinder is pressurized and maintains the quick-disconnect device in the locking position.

8. The combination of the attachment, the power device and the quick-disconnect device of claim 6 wherein if said hydraulic cylinder losses pressure said over center or locking portion maintains the quick-disconnect device in the locking position.

\* \* \* \* \*